US007356835B2

(12) United States Patent
Gancarcik et al.

(10) Patent No.: US 7,356,835 B2
(45) Date of Patent: Apr. 8, 2008

(54) SECURITY MONITOR FOR PDA ATTACHED TELEPHONE

(75) Inventors: Edward Peter Gancarcik, Ottawa (CA); James Michael Kelly, Smith Falls (CA)

(73) Assignee: Mitel Networks Corporation, Ottawa, Ontario (CA)

(*) Notice: Subject to any disclaimer, the term of this patent is extended or adjusted under 35 U.S.C. 154(b) by 680 days.

(21) Appl. No.: 10/926,077

(22) Filed: Aug. 26, 2004

(65) Prior Publication Data

US 2005/0081060 A1 Apr. 14, 2005

(30) Foreign Application Priority Data

Aug. 26, 2003 (GB) ................................ 0319950.2

(51) Int. Cl.
*H04L 9/32* (2006.01)
*G06F 1/26* (2006.01)

(52) U.S. Cl. ................................ 726/2; 726/3; 726/34

(58) Field of Classification Search ................ 726/2-3, 726/34-35

See application file for complete search history.

(56) References Cited

U.S. PATENT DOCUMENTS 5,406,260 A 4/1995 Cummings
5,630,058 A * 5/1997 Mosley et al. ................ 726/35
5,675,321 A 10/1997 McBride
5,715,174 A * 2/1998 Cotichini et al. ........... 709/229
5,911,777 A 6/1999 Heredia
6,021,493 A 2/2000 Cramer et al.
6,064,305 A 5/2000 Lockyer
6,172,606 B1 1/2001 Lockyer
2001/0056483 A1 12/2001 Davis et al.
2002/0108058 A1 8/2002 Iwamura et al.
2002/0188866 A1 12/2002 Ca et al.

FOREIGN PATENT DOCUMENTS

EP 0 909 056 A3 9/1999
GB 2 310 750 A 9/1997

* cited by examiner

*Primary Examiner*—Hosuk Song
(74) *Attorney, Agent, or Firm*—Michelle Whittington, Esq

(57) ABSTRACT

A user enabled application for monitoring the presence of a PDA connected to a network via a cradle and, in response, ringing a phone in the vicinity of the PDA. The display on the telephone displays a message that asks the user to enter an access code via the telephone dialpad. If the user enters the correct access code then nothing happens and the phone continues to work as normal. If, however, the correct access code is not entered, the system communicates the unauthorized removal of the PDA to pre-selected phone numbers, pager numbers or email addresses. Appropriate steps can then be taken to try to and recover the missing device.

11 Claims, 6 Drawing Sheets

SECURITY MONITOR FOR PDA ATTACHED TELEPHONE

BACKGROUND OF THE INVENTION

1. Field of the Invention

The present invention is directed to theft prevention systems, and more particularly to a method of monitoring electronic devices connected to a network and implementing security measures in the event of theft.

2. Description of the Related Art

With the increasing popularity of small, portable electronic devices such as PDAs (Personal Digital Assistants) and laptop computers, incidences of theft of such devices is on the rise. Within an office or other enterprise, it is common for users to connect such devices to a network for data synchronization, communications, etc. For example, the Mitel 5230 IP Appliance sets forth a system for docking a PDA to an IP telephone in order to take advantage of and/or control network-implemented PBX call features.

It is also common for users to leave such devices unattended, while the devices are connected to the network (e.g. in order to attend a meeting, take a lunch break, etc.), thereby exposing the devices to potential theft.

Mobile device security products available in the market today can be generally categorized into two groups. The first group consists of physical "locks" which restrict product removal by preventing protected devices from being physically removed from a fixed anchor point (akin to cable locks for bicycles). This type of security product can be both cumbersome for frequent device removal and impractical for small handheld devices. The second group of security products involve the use of a software application installed in the mobile device for restricting access to stored data in the event of unlawful removal of the device. Unfortunately, the inclusion of such application software does nothing to prevent or deter the actual unauthorized removal of the device.

SUMMARY OF THE INVENTION

It is an object of an aspect of the invention to simplify mobile device security relative to the foregoing prior art and to contribute to a reduction in actual theft of mobile computing and communication devices. Moreover, the principles of the invention may also be applied to resource protection for fixed devices such as printers, fax machines, and even desktop PC's.

Therefore, according to the invention, a user enabled application monitors the presence of a device connected to the network at a user location having a phone. For example, in the Mitel 5230 IP Appliance, the application monitors the presence of a PDA disposed in a cradle incorporated into an IP phone. According to the present invention, in the event of unauthorized removal of the device (e.g. if someone removes the PDA from the cradle), the phone starts to ring, notifying the person that the system has detected an 'event'. The display on the telephone then shows a message that asks the user to enter an access code or PIN via the phone dialpad. If the correct access code is entered then nothing happens and the phone continues to work as normal. If, however, no access code is entered or an incorrect access code is entered, the system notifies a third party (e.g. the owner via his/her cellular telephone or pager, a security guard, etc.) of the unauthorized removal of the device. Appropriate steps can then be taken to try and recover the missing device.

On the other hand, authorized users who wish to remove PDA's simply enter their access code either before or after the device is removed (entering the access code or PIN before removal avoids having the phone ring initially).

DETAILED DESCRIPTION OF THE PREFERRED EMBODIMENTS

Figure 1A:
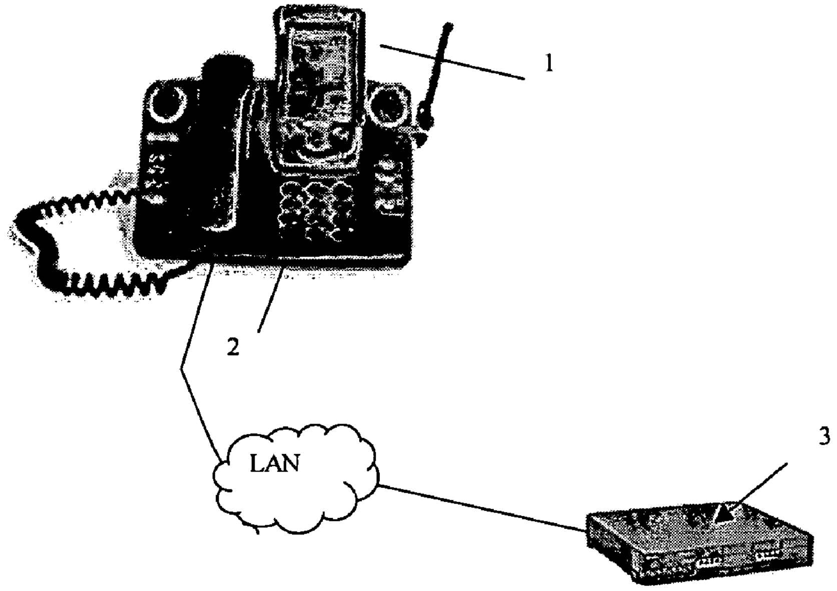
FIGS. 1A-1C show operation of the invention in the event of unauthorized removal of a PDA from its cradle.
Figure 1B:
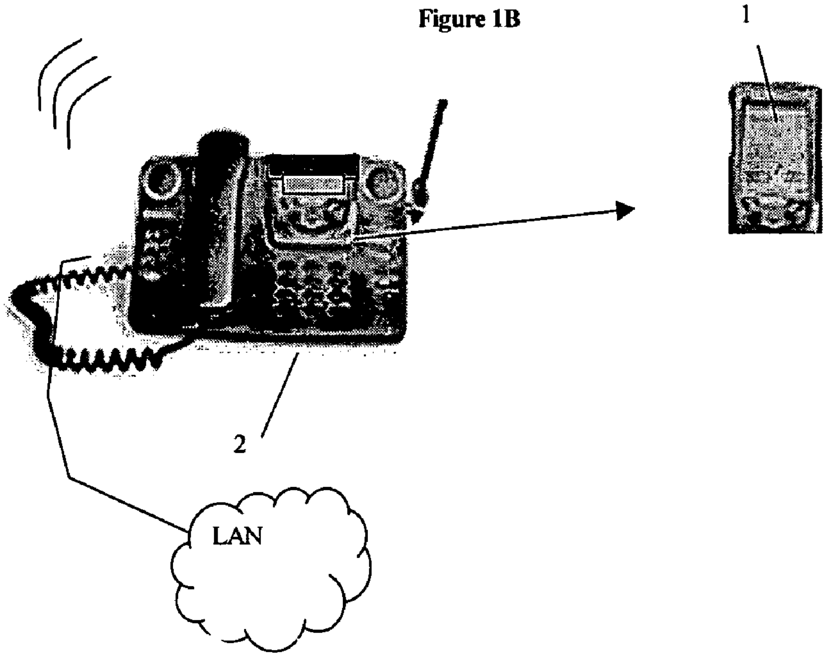
Figure 1C:
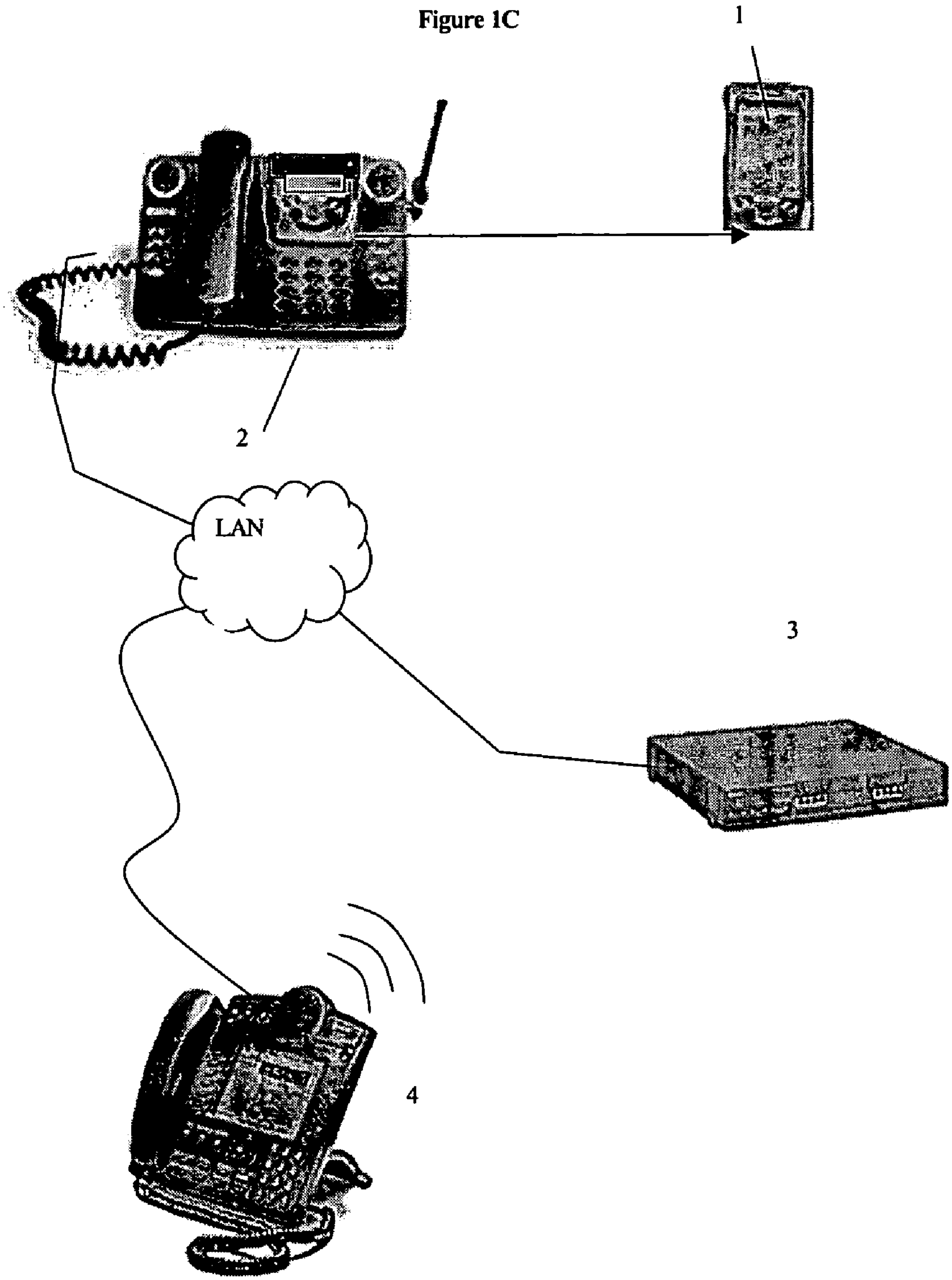

Turning to FIGS. 1A-1C, a PDA 1 is shown connected to an IP phone 2 via a cradle, commercially available as the Mitel 5230 IP Appliance. The phone 2 is connected via an IP access portal to an iPBX 3, or other communication device, in a well-known manner. According to the invention, iPBX 3 executes an application for monitoring the presence of PDA 1 in the cradle. As shown in FIGS. 1B-1C, upon removal of the PDA from the cradle, the application causes phone 2 to ring and a message is displayed on the phone prompting entry of an appropriate access code or PIN. If no or an incorrect PIN is entered, iPBX 3 sends an alarm message to a security phone 4, and/or other user-selected location (e.g. the PDA owner's pager or cellular telephone).

Figure 2:
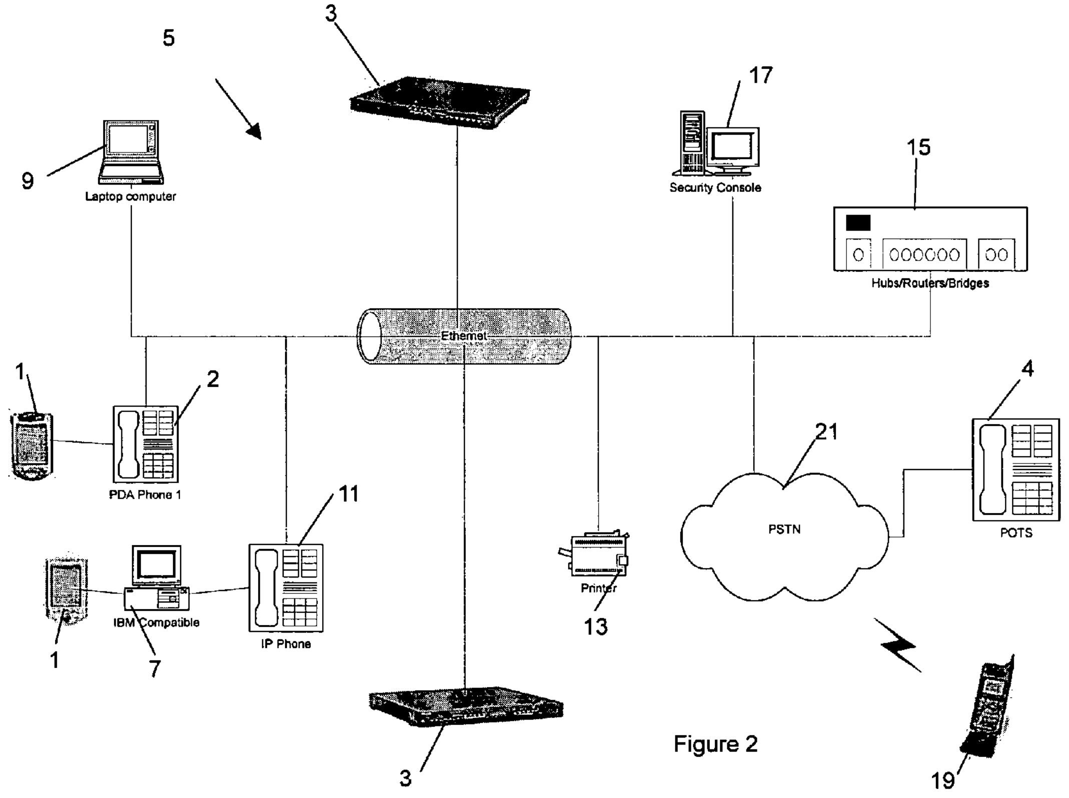
FIG. 2 is a schematic representation of a typical network configuration that contains a plurality of smart devices, such as PC's, PDA's, and phones, and dumb devices such as printers, routers, etc., forming the implementation environment for the present invention.

FIG. 2 depicts a typical (small) IP network configuration 5 that contains a plurality of "smart" devices and "dumb" devices. A smart device is any device that is capable of executing a software client application (e.g. PDA 1, PC 7, laptop computer 9, IP phone 11, etc). A dumb device is a device which is connected to the network but is incapable of having software loaded thereon, but which nonetheless can be monitored for connectivity (e.g. a printer 13, router 15, etc).

Figure 3:
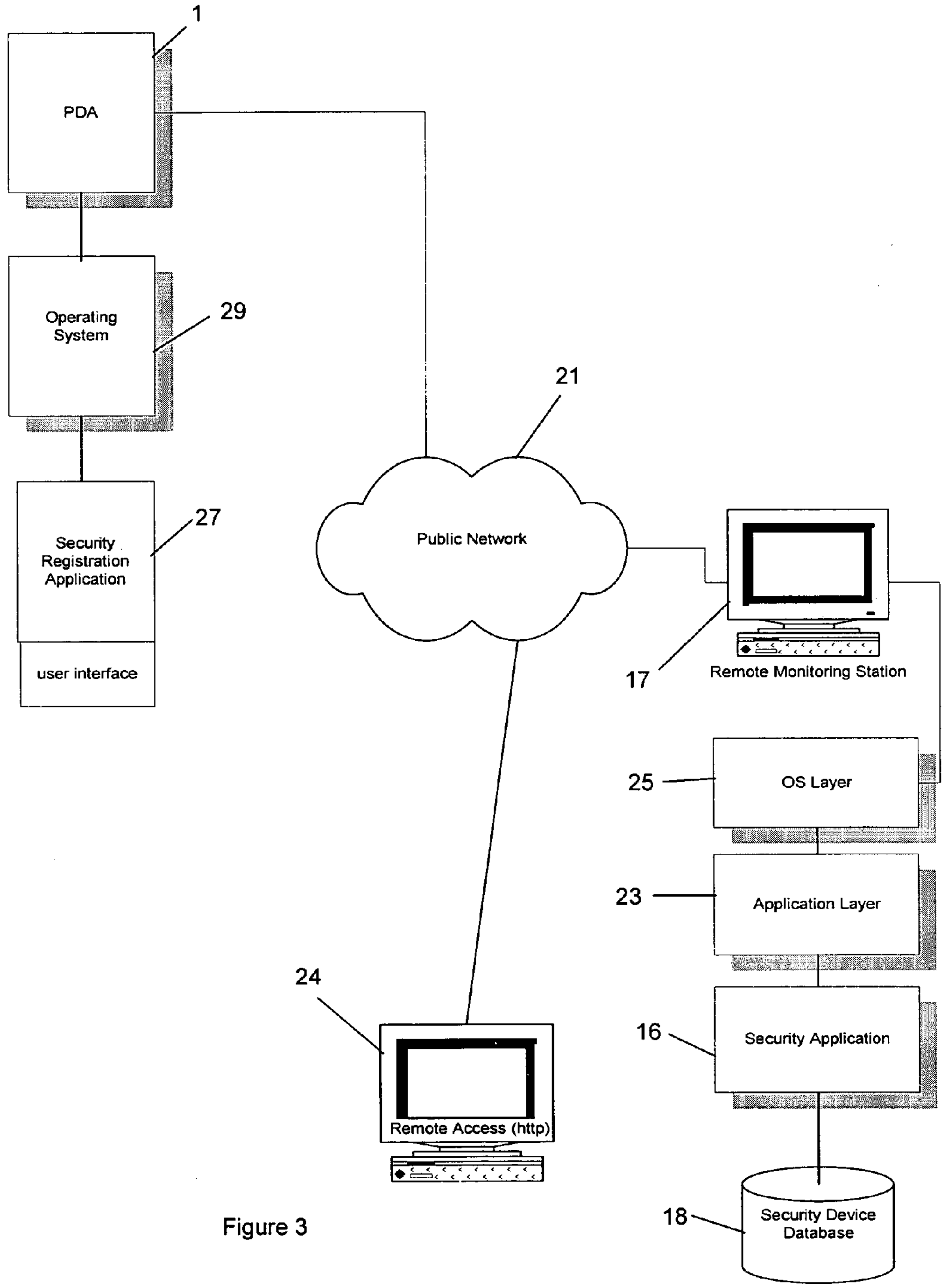
FIG. 3 depicts a typical client/server network on which the security system according to the present invention is implemented.

According to the present invention, each smart device (client), upon connecting to the network, registers its presence with a central security application 16, as shown in FIG. 3. The security application may be loaded on and executed from a network security PC 17, an iPBX, or any network smart device running the security server software of the present invention. The server software registers the device's MAC address in a database 18 and then begins monitoring the device by pinging the network for the device's MAC address, according to a preset time interval. The security application 16 is wrapped in an application layer 23 and OS layer 25, in a conventional manner. In response to removal of the device from the network, an unregistration challenge process occurs. If the device is removed from the network without unregistering it, the security server software 16 detects the removal and in response contacts users/security as selected by the user.

Since a dumb device is considered to be a fixed device that should always be connected to the network, connection information for such devices is stored permanently in the security server database 18 and scanned for connectivity, since they should never be absent from the network. If the server software detects the absence of a dumb device, security is contacted to investigate.

The client software 27 running on the smart devices allow a user to configure parameters such as access codes, changing of access codes, emergency contacts . . . etc. The emergency contact information details who the system should contact in the event the network device is removed in an unauthorized manner. With the convergence of voice and data on an IP network, the contact information details can contain both phone numbers and computer addresses. For example, if PDA 1 is disconnected from a network in an unauthorized manner, the security server 17 proceeds to make contact with one or more people via the contact details. For example, the server may first call security 4 and then call the user on his/her cell phone 19, via PSTN 21, and then e-mail other individuals, or send text messages to cell phones/pagers . . . etc.

Remote access 24 in FIG. 3 allows the network containing security-protected devices to be administered from anywhere there is Internet access. Alarm status, downloading of network statistics, enabling of features can all be done from anywhere an Internet connection can be obtained.

According to an additional aspect of the invention, intellectual property contained within a smart device is protected from theft. As discussed above, when a smart device connects to the network 5, the client server (including registration application 27 and OS 29) running on the smart device 1 registers itself with the security server 17. If the smart device 1 is removed without having been previously deregistered, the security server flags the device as missing and starts the contacting process discussed above. However, depending on the response time of security/individuals, the thief could still abscond with the device 1 and the intellectual property (including personal information) contained within the stolen device. Therefore, the client security software 27 may be configured to encrypt/delete information on the device in the event that the device is removed in an unauthorized manner. For example, if PDA 1 is stolen, the client software challenges the user for an access code/PIN (or other suitable security challenge, such as correctly answering a question). If the user fails the challenge, the internal PDA database (including personal such as addresses and credit card numbers) is cleared. This database clearing can be done, for example, by issuing a software command equivalent to activating the special reset button conventionally incorporated in present day PDAs. In the case of a PC or laptop 9, whose data normally is not backed up as often as PDA data, an alternative to deleting the information is to encrypt it on the hard disk should the user fail the challenge. Likewise, rather than clearing the PDA database, it too can be encrypted and a "security code" enabled to allow protected information to be viewed only by entering the security pass code.

Figure 4:
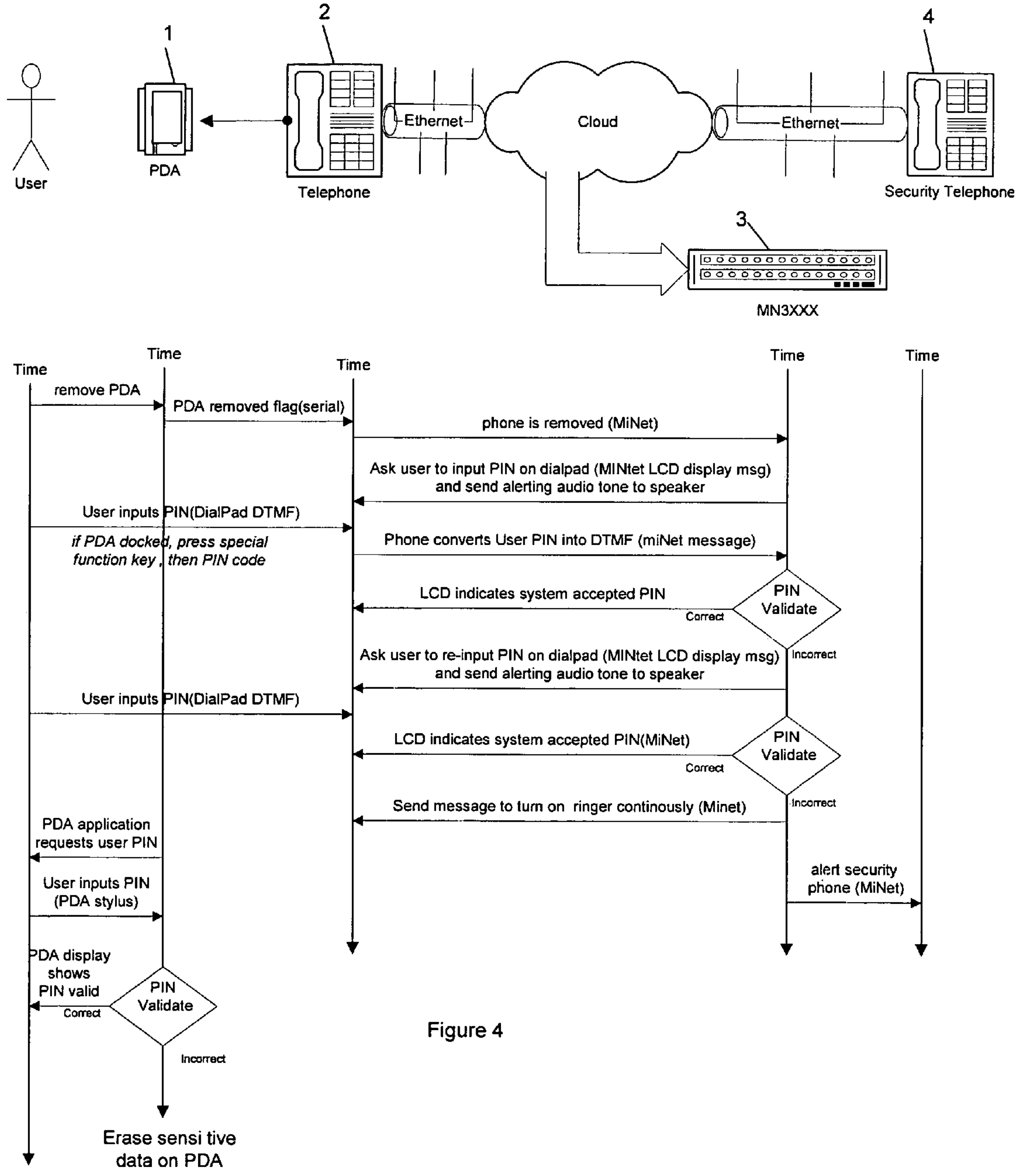
FIG. 4 is a system interaction chart showing the sequence of events that occur when a PDA is removed from the protected network of FIG. 3, according to the preferred embodiment.

FIG. 4 is a system interaction chart that shows the sequence of events that occur when a user removes a PDA from a protected network. At the top of the chart, the removal of PDA 1 from its cradle triggers a number of events between the connected system 3 and the device itself. The first indication to the user is that the display on the phone 2 prompts entry of a PIN number. The user is given one chance either to enter the correct PIN, or return the PDA 1 to its cradle. Otherwise the alarm sounds (i.e. the phone 2 begins ringing with a distinctive ring pattern). The PIN input is effected using the numeric dialpad of the phone 2. All message transactions between the phone and the system 3 are standard MiNet based messages contained within an 802.3 Ethernet packet frame.

Figure 5:
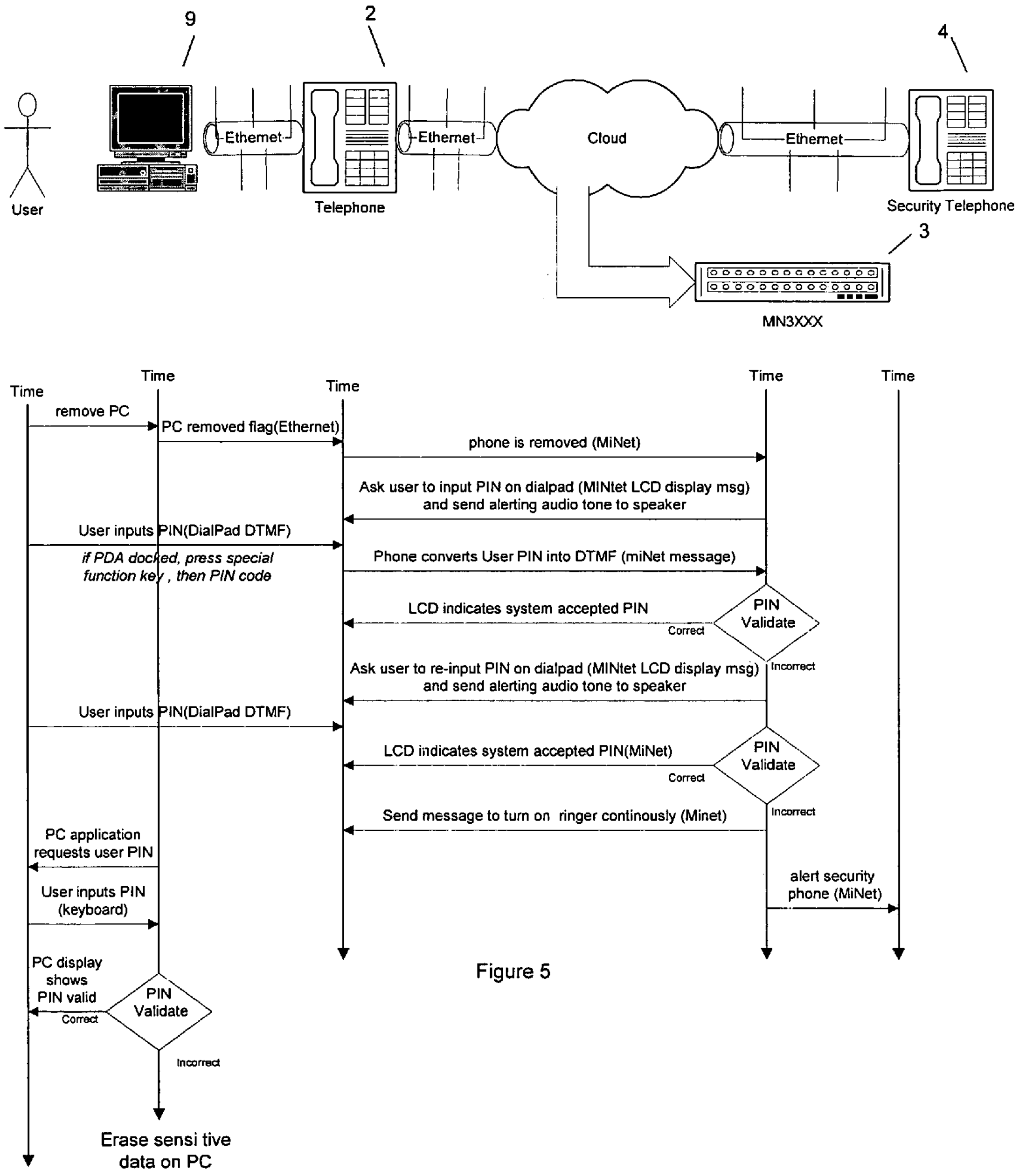
FIG. 5 is a system interaction chart showing the sequence of events that occur when another device, such as a desktop PC or laptop, is removed from the protected network, according to an alternative embodiment.

FIG. 5 is similar to the interaction chart of FIG. 4, except that FIG. 5 shows that it relates to monitoring desktop PC's and laptops 9 via Ethernet MAC presence monitoring.

Both of FIGS. 4 and 5 illustrate that the user PIN input stage is reached either directly as a result of the device being removed, or alternatively as a result of the user pressing a function key and then entering the code while the PDA is still in the cradle. In both cases correct PIN entry avoids setting off alarm conditions.

The many features and advantages of the invention are apparent from the detailed specification and, thus, it is intended by the appended claims to cover all such features and advantages of the invention that fall within the sphere and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A security system within a network of connected devices, comprising:

a database containing contact information including at least one of a security phone number, user phone number, user pager number or email address;

a server application for periodically monitoring unauthorized removal of at least one of said devices to said network and in the event of detecting unauthorized removal of said at least one device from the network then communicating said unauthorized removal in accordance with said contact with said contact information; and a phone in the vicinity of said at least one device, said phone operating under control of said server application to generate a display for prompting entry of an access code upon detection of said unauthorized removal, whereby correct entry of said access code prevents communicating said unauthorized removal.

2. The security device of claim 1, wherein said at least one device is selected from the group comprising a PDA, an IP phone, a router, a printer, a laptop and a PC.

3. A security system within a network of connected devices, comprising;

a database containing contact information;

a server application for periodically monitoring unauthorized removal of at least one of said devices to said network and in the event of detecting unauthorized removal of at least of said at least one device from the network then communicating said unauthorized removal in accordance with said contact information;

a client application for registering a MAC address of at least one of said devices with said server application upon initial connection to the network, whereupon said server application monitors said unauthorized removal by pinging the network for MAC address and in the absence of a response renders said device inoperable; and a phone in the vicinity of at least one device, said phone operating under control of said server application to generate a display for prompting entry of an access code upon detection of said unauthorized removal, whereby correct entry of said access code prevents communicating said unauthorized removal.

4. The security device of claim 3, wherein said client application deletes/encrypts at least one internal database of said device for rendering the device inoperable.

5. The security device of claim 3, wherein said client application encrypts data in at least one internal database of said device for rendering the device inoperable.

6. A method of monitoring devices connected to a network and implementing security measures in the event of disconnection therefrom, comprising:

storing contact information in database, said contact information includes at least one of a security phone number, user phone number, user pager number or email address; and periodically monitoring unauthorized removal of at least one of said devices to said network; and in the event of detecting unauthorized removal of said at least one device from the network the i) communicating said unauthorized removal in accordance with said contact information, and ii) generating a display at a phone in the vicinity of said at least one device for prompting entry of an access code upon detection of said unauthorized removal, whereby correct entry of said access code prevents communicating said unauthorized removal.

7. The method of claim 6, wherein said at least one device is selected from the group comprising a PDA, an IP phone, a router, a printer, a laptop and a PC.

8. A method of monitoring devices connected to a network and implementing security measures in the event of disconnection therefrom, comprising:

storing contact information in a database;

periodically monitoring unauthorized removal of at least one of the devices to the network; and registering a MAC address of the at least one device upon an initial connection to the network, and subsequently monitoring the connection by pinging the network for the MAC address and in the event of detecting unauthorized removal of the at least one device from the network then i) communicating the unauthorized removal in accordance with the contact information, and ii) generating a display at a phone in the vicinity of the at least one device for prompting entry of an access code upon detection of the unauthorized removal, whereby correct entry of the access code prevents communicating the unauthorized removal.

9. The method of claim 8, further including rendering said device inoperable in response to detecting said unauthorized removal.

10. The method of claim 9, wherein said rendering of said device inoperable includes deleting at least one internal database of said device.

11. The method of claim 9, wherein said rendering of said device inoperable includes encrypting data in at least one internal database of said device.

* * * * *